United States Patent [19]

Ichihashi et al.

[11] Patent Number: 4,905,961

[45] Date of Patent: Mar. 6, 1990

[54] ELECTROMAGNETIC ACTUATOR

[75] Inventors: Kouji Ichihashi; Jun-ichi Tani; Katsuhiko Tsukazaki; Hiroshi Sakuyama; Nobuo Baba; Kiyoji Nakajima; Takaaki Arai; Akira Inaba, all of Higashimatsuyama, Japan

[73] Assignee: Diesel Kiki Co., Ltd., Tokyo, Japan

[21] Appl. No.: 331,855

[22] Filed: Apr. 3, 1989

[30] Foreign Application Priority Data

Apr. 18, 1988 [JP] Japan .................. 63-93476

[51] Int. Cl.[4] ............ F16K 31/06; F16K 31/40; H01F 7/08
[52] U.S. Cl. ............. 251/129.15; 251/129.08; 335/262
[58] Field of Search ........... 251/129.15, 129.01, 251/129.21, 129.08; 335/262, 278

[56] References Cited

U.S. PATENT DOCUMENTS 3,851,285 11/1974 Rothfuss et al. ............... 335/262 X
4,763,872 8/1988 Ichihashi et al. .

FOREIGN PATENT DOCUMENTS 55-7930   2/1980  Japan .
60-44540 10/1985  Japan .
62-98409  5/1987  Japan .
62-261782 11/1987 Japan .
63-11984  1/1988  Japan .

Primary Examiner—Arnold Rosenthal

[57] ABSTRACT

An electromagnetic actuator includes a housing and a pair of stators cooperating with the housing to form a magnetic circuit for a solenoid. Each of the pair of stators has a tubular portion, and the tubular portions of the pair of stators have their one ends disposed in the opposed spaced relation to each other. The solenoid is mounted around the tubular portions of the pair of stators, and an armature is received in the tubular portions of the pair of stators so as to be movable along the axis of the tubular portions. The armature is supplied with a force when an electric current is applied to the solenoid. In order to keep the magnetic resistance of the magnetic circuit to a low level, one of the pair of stators is formed integrally with one end of a tubular body of the housing so that the housing and the one stator constitute a unitary member.

4 Claims, 1 Drawing Sheet

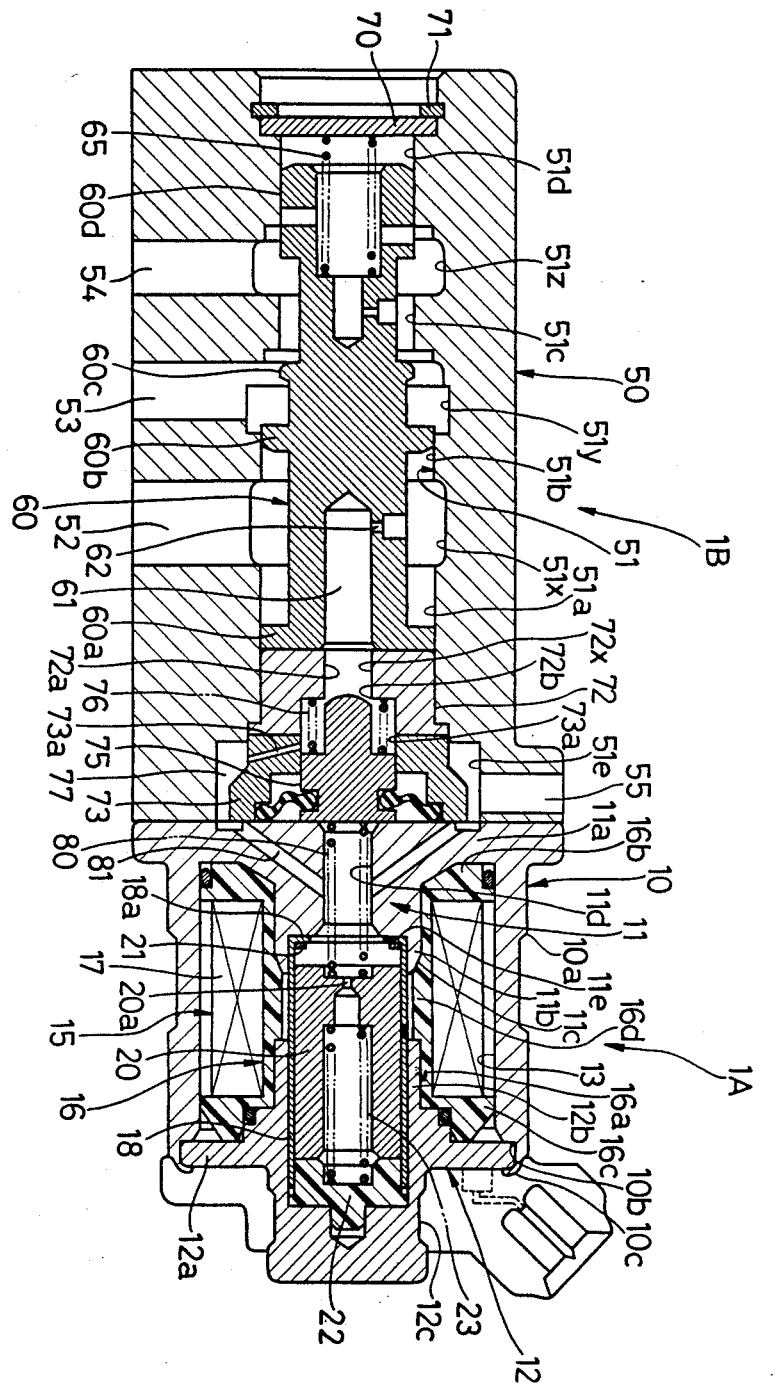

1

ELECTROMAGNETIC ACTUATOR

BACKGROUND OF THE INVENTION

1. Field of the Invention

This invention relates to an electromagnetic actuator for controlling a valve or the like.

2. Prior Art

As disclosed in U.S. Pat. No. 4,763,872 corresponding to Japanese Laid-Open (Kokai) Utility Model Application Nos. 11984/88 and 18686/88, Japanese Laid-Open (Kokai) Patent Application Nos. 98409/87 and 261782/87, and Japanese Patent Publication Nos. 7930/80 and 44540/85, a conventional electromagnetic actuator comprises three main component parts made of a magnetic material, that is, a housing and a pair of stators. These three component parts jointly constitute a magnetic circuit for a solenoid later described. More specifically, the housing has a tubular body, and the pair of stators are mounted on the opposite ends of the housing, respectively. Each of the two stators has a central tubular portion, and the tubular portions of the two stators have their one ends disposed in opposed spaced relation to each other. The solenoid of an annular shape is mounted around the tubular portions of the pair of stators, and an armature is disposed in the tubular portions of the pair of stators so as to be axially movable. When a direct current is supplied to the solenoid, a force is applied to the armature so that the armature is moved from one of the two stators toward the other.

In the above conventional electromagnetic actuator, the housing and the pair of stators are provided as three separate parts, respectively, and the pair of stators are held in face-to-face contact with the tubular housing body to form the magnetic circuit. There inevitably exists a slight or narrow space in the area of face-to-face contact between the tubular housing body and each stator, and the magnetic circuit has a relatively great magnetic resistance because of the presence of such a space. As a result, the magnetic force produced in the solenoid is small, and therefore the armature and a device operatively connected to the armature, such as a valve, could not be controlled in a stable manner.

SUMMARY OF THE INVENTION

It is therefore an object of this invention to provide an electromagnetic actuator in which the magnetic resistance of the magnetic circuit for the solenoid is kept to a low level so as to increase an exciting force of the solenoid, thereby enabling a stable control.

According to the present invention, there is provided an electromagnetic actuator comprising:

(a) a housing made of a magnetic material and having a tubular body;

(b) a pair of stators made of a magnetic material and disposed at the opposite ends of the tubular housing body, respectively, each of the pair of stators having a tubular portion, the tubular portions of the pair of stators being disposed coaxially with each other and having their one ends disposed in opposed spaced relation to each other, and one of the pair of stators being formed integrally with one end of the tubular housing body so that the one stator and the housing constitutes a unitary member;

(c) annular solenoid means accommodated within the housing and having opposite end portions in which the tubular portions of the pair of stators are received, respectively, the tubular portions of the pair of stators and the solenoid means jointly forming a space, the housing and the pair of stators jointly constituting a magnetic circuit for the solenoid means; and (d) an armature received within the space and being operable by the solenoid means to move along the axis of the tubular portions, and the solenoid means, when supplied with an exciting electric current, imparting a force to the armature.

BRIEF DESCRIPTION OF THE DRAWING

The drawing is a cross-sectional view of an electromagnetic proportional pressure control valve device incorporating an electromagnetic actuator provided in accordance with the present invention.

DESCRIPTION OF THE PREFERRED EMBODIMENT OF THE INVENTION

A preferred embodiment of the invention will now be described with reference to the drawing.

The drawing shows an electromagnetic proportional pressure control valve device for controlling the operation of a clutch of an automobile or the like. This electromagnetic proportional pressure control valve device comprises an electromagnetic actuator 1A and a control valve 1B.

The electromagnetic actuator 1A comprises a housing 10 made of a magnetic material. The housing 10 has a tubular body 10a of a circular cross-section, and a first stator 11 is formed integrally with one end (i.e., left-hand end in the drawing) of the tubular housing body 10a to which the control valve 1B is connected. In other words, the housing 10 and the first stator 11 jointly constitute a one-piece or unitary member or component part. The first stator 11 has a base portion 11a integrally connected to the one end of the tubular housing body 10a and disposed perpendicular to the axis of the housing body 10a, and a tubular portion 11b of a circular cross-section extending from one side of the base portion 11a at a central portion thereof in a direction away from the control valve 1B (i.e., in a right-hand direction in the drawing). The tubular portion 11b is disposed coaxially with the tubular housing body 10a, and the outer peripheral surface 11c of the distal end section of the tubular portion 11b is tapered toward its distal end remote from the base portion 11a. The first stator 11 also has a central bore 11d extending through the base portion 11a coaxially with the tubular housing body 10a and communicating directly with the tubular portion 11b at its one end remote from the control valve 1B to thereby form a continuous axial bore through the first stator 11. The bore 11d is smaller in diameter than the bore of the tubular portion 11b so that a stepped portion or shoulder 11e is formed on the inner surface of the above continuous bore at a position where the bore 11d and the bore of the tubular portion 11b are joined together.

A second stator 12 made of a magnetic material is connected to the other or distal end (i.e., right-hand end in the drawing) of the tubular housing body 10a. The second stator 12 has a base portion 12a disposed perpendicular to the axis of the tubular housing body 10a and closing the other end thereof, and an inner tubular portion 12b extending perpendicularly from the inner side of the base portion 12a at a central portion thereof and disposed within the tubular housing body 10a, and an outer tubular portion 12c extending perpendicularly from the outer side of the base portion 12a at the central portion thereof. The tubular housing body 10a is thinned at its distal end to form an annular thinned portion 10c and also to form an annular shoulder or stepped portion 10b at its inner peripheral surface immediately adjacent to the thinned portion 10c. The thinned portion 10c is deformed and clamped to the outer peripheral edge portion of the base portion 12a by pressing in such a manner that the outer marginal portion of the inner surface of the base portion 12 is held in face-to-face contact with the shoulder 10b. The inner and outer tubular portions 12b and 12c are disposed coaxially with the tubular portion 11b of the first stator 11. The base portion 12a of the second stator 12 has a central hole formed therethrough and interconnecting the bores of the inner and outer tubular portions 12b and 12c. The tubular portion 11b of the first stator 11 is equal in inner and outer diameters to the inner tubular portion 12b of the second stator 12, and the distal ends of the two tubular portions 11b and 12b are disposed in spaced opposed relation. The distal end of the outer tubular portion 12c remote from the base portion 12a is closed.

The housing 10, the first stator 11 and the second stator 12 jointly constitute a magnetic circuit for a solenoid 17 later described. Since the housing 10 is integral with the first stator 11, there is no space between them at all. This can reduce the resistance of the magnetic circuit to a minimum. Further, the second stator 12 is held in face-to-face contact with the shoulder 10b by the pressed thinned portion 10c, and therefore there can be obtained a good contact between the second stator 12 and the housing 10. This also can reduce the magnetic resistance of the above magnetic circuit.

An annular inner space 13 is defined by the housing 10, the first stator 11 and the second stator 12. The second stator 12 also serves as a closure member for closing the inner space 13.

A solenoid assembly 15 is accommodated within the inner space 13. The solenoid assembly 15 comprises an annular bobbin 16 made of a non-magnetic material such as a resin, and a coil or solenoid 17 mounted on the bobbin 16. The bobbin 16 has a tubular portion 16a around which the coil or solenoid 17 is wound, and a pair of end walls 16b and 16c formed at the opposite ends of the tubular portion 16a.

The tubular portion 16a is disposed coaxially with the tubular portions 11b of the first stator 11 and the tubular portion 12b of the second stator 12, and the inner peripheral surface of the tubular portion 16a is held in contact with the outer peripheral surfaces of the tubular portions 11b and 12b. The end wall 16b is held in contact with the inner peripheral surface of the tubular housing body 10a and the base portion 11a of the first stator 11 whereas the other end wall 16c is held in contact with the inner peripheral surface of the tubular housing body 10a and the base portion 12a of the second stator 12. With this arrangement, the solenoid assembly 15 is held in position against movement within the inner space 13.

The tubular portion 16a of the bobbin 16 has an annular projection 16d formed on the inner peripheral surface thereof at its central portion (that is, intermediate the opposite ends thereof) and extending along the axis thereof, the annular projection 16d having a uniform thickness throughout the entire circumference thereof. The annular projection 16d is interposed between the opposed ends of the tubular portions 11b and 12b of the first and second stators 11 and 12 in such a manner that the opposite ends of the projection 16d are held against the opposed ends of the tubular portions 11b and 12b, respectively.

A guide tube 18 has a circular cross-section and is made of a non-magnetic material such as a stainless steel, and one end portion of the guide tube 18 is fitted in the tubular portion 11b of the first stator 11 while the other end portion of the guide tube 18 is fitted in the tubular portions 12b and 12c of the second stator 12. An armature 20 of a hollow cylindrical shape having an orifice 20a is received within the guide tube 18 for sliding movement along the axis thereof. The guide tube 18 has at its one end an inwardly-directed peripheral flange 18a which is held against the shoulder 11e of the first stator 11, and a spacer ring 21 of a non-magnetic material is secured to the inner surface of the flange 18a. The sliding movement of the armature 20 in a left-hand direction is limited by the flange 18a and the spacer 21. A stopper 22 made of a non-magnetic material such as a resin is received within the outer tubular portion 12c of the second stator 12 and is held against the closed end thereof, and the sliding movement of the armature 20 in a right-hand direction is limited by the stopper 22.

A spring 23 of a relatively small force acts between the armature 20 and the stopper 22 so as to prevent the rattling of the armature 20.

The control valve 1B will now be described. The control valve 1B comprises a housing 50 connected at one end to the housing 10 of the electromagnetic actuator 1A. The valve housing 50 has a through hole or bore 51 formed axially therethrough. Three annular grooves 51x, 51y and 51z (which are provided in this order from the right-hand end of the housing 50) are formed in the surface of the through hole 51 and spaced along the axis thereof, so that the surface of the through hole 51 has four annular guide portions 51a, 51b, 51c and 51d spaced from one another by the annular grooves 51x, 51y and 51z. Thus, these annular grooves 51x to 51z and annular guide portions 51a to 51d are arranged alternately. The two right-hand annular guide portions 51a and 51b are greater in diameter than the two left-hand annular guide portions 51c and 51d. The through hole 51 has at its right-hand end a greater-diameter portion 51e which is continuous with the annular guide portion 51a.

A supply port 52, an actuator port 53 and two tank ports 54 and 55 are formed in the valve housing 50 and extend radially between the through hole 51 and the outer peripheral surface of the valve housing 50.

A pump (not shown) is connected to the outer end of the supply port 52 so as to supply a pressurized operating oil thereto, and the inner end of the supply port 52 communicates with the annular groove 51x. The outer end of the actuator port 53 is connected to an actuator for driving a clutch, and its inner end communicates with the annular groove 51y. The outer ends of the two tank port 54 and 55 are connected to a tank. The inner end of the tank port 54 communicates with the annular groove 51z while the inner end of the other tank port 55 communicates with the greater-diameter portion 51e of the through hole 51.

A spool 60 is received within the through hole 51 of the valve housing 50 so as to be slidable along the axis thereof. The spool 60 has four annular lands 60a, 60b, 60c and 60d which are provided in this order from its right-hand end. The two right-hand lands 60a and 60b are greater in diameter than the two left-hand lands 60c and 60d. The lands 60a and 60d are always held in sliding contact with the annular guide portions 51a and 51d, respectively. The lands 60b and 60c are brought into and out of sliding contact with the annular guide portions 51b and 51c, respectively, in accordance with the position of the spool 60 relative to the valve housing 50.

The spool 60 has a pilot chamber 61 formed in its right-hand end portion and extending along the axis thereof, the pilot chamber 61 opening to the right-hand end face of the spool 60. The spool 60 also has an orifice 62 formed through a peripheral wall defining the pilot chamber 61. The pilot chamber 61 communicates with the supply port 52 through the orifice 62 and the annular groove 51x.

The left-hand end of the through hole 51 is closed by a closure plate 70 fixed to the valve housing 50 by a retainer ring 71. A stopper 72 is fixedly fitted in the right-hand end portion of the annular guide portion 51a of the through hole 51. The stroke of movement of the spool 60 along the through hole 51 is determined by the closure plate 70 and the stopper 72. The spool 60 is urged against the stopper 72 by a coil spring 65 acting between the closure plate 71 and the spool 60.

The stopper 72 has a central bore 72x formed axially therethrough and communicating with the pilot chamber 61. The left-hand half 72a of the central bore 72x is reduced in diameter, and this reduced-diameter portion 72a serves as a valve port. A shoulder 72b between the valve port (reduced-diameter portion) 72a and the greater-diameter portion of the central bore 72x serves as a valve seat.

A guide member 73 is received within the greater-diameter portion 51e of the valve housing 50, and is held between the stopper 72 and the first stator 11 of the electromagnetic actuator 1A against movement. The guide member 73 has a stepped hole 73a formed axially therethrough, this through hole 73a directly communicating with the central bore 72x of the stopper 72 in coaxial relation thereto. A pilot valve 75 is received in the guide member 73 and extends into the central bore 72x of the stopper 72. More specifically, the pilot valve 75 is received in a left-hand smaller-diameter portion of the through hole 73a so that this smaller-diameter portion guides the sliding movement of the pilot valve 75. In accordance with the position of the pilot valve 75 relative to the valve seat 72b, the degree of valve opening (that is, the area of opening between the front end of the pilot valve 75 and the valve seat 72b) is varied. The pilot valve 75 is normally urged against the first stator 11 by a coil spring 76 acting between the stopper 72 and the pilot valve 75.

An oil reservoir chamber 77 is formed between the outer peripheral surface of the guide member 73 and the surface of the greater-diameter portion 51e. The guide member 73 has an orifice 73a extending generally radially from its inner peripheral surface to outer peripheral surface. The pilot chamber 61 communicates with the tank port 55 via the valve port 72a, the space between the valve seat 72b and the pilot valve 75, the orifice 73a and the oil reservoir chamber 77. A strong coil spring 80 having a very high spring constant is received in the continuous axial bore formed through the first stator 11 and is held at its opposite ends in contact with the pilot valve 75 and the armature 20 of the electromagnetic actuator 1A in its substantially uncompressed condition. A force applied to the armature 20 is transmitted to the pilot valve 75 through the coil spring 80.

The first stator 11 has communication passages 81 communicating the oil reservoir chamber 77 with the bore 11d to thereby fill the interior of the guide tube 18 with the operating oil. When the armature 20 is moved, the operating oil is forced through the orifice 20a of the armature 20 so that the movement of the armature 20 is dampened by the resistance offered by the flow of the operating oil through the orifice 20a.

In the above electromagnetic proportional pressure control valve device, when a direct current is not supplied to the solenoid 17, the pilot valve 75 is held against the first stator 11 under the influence of the coil spring 76, and also the armature 20 is held against the stopper 22, as shown in the drawing. In this condition, the area of flow between the pilot valve 75 and the valve seat 72b is large, and therefore the pressure within the pilot chamber 61 escapes to the tank port 55, so that the pressure within the pilot chamber 61 is low. Therefore, the spool 60 is held against the stopper 72 under the influence of the coil spring 65. In this position of the spool 60, the land 60b is held in contact with the annular guide portion 51b, and the land 60c is out of contact with the annular guide portion 51c, so that the actuator port 53 is prevented from communicating with the supply port 52 but is in communication with the tank port 54, so that the hydraulic pressure is not applied to the actuator for operating the clutch.

When a direct current is applied to the solenoid 17, a magnetic force substantially proportional to the intensity of this direct current is imparted to the armature 20, so that the armature 20 is moved toward the first stator 11. In accordance with this movement of the armature 20, the pilot valve 75 is moved toward the valve seat 72b through the coil spring 80 to reduce the area of flow between the pilot valve 75 and the valve seat 72b. As a result, the pressure within the pilot chamber 61 increases so that the spool 60 is moved in the left-hand direction against the bias of the coil spring 65. As a result of this movement of the spool 60, the land 60b is moved out of contact with the annular guide portion 51b whereas the land 60c is brought into contact with the annular guide portion 51c. As a result, the actuator port 53 is caused to communicate with the supply port 52 and also ceases to communicate with the tank port 54, so that the pressure within the actuator port 53 increases.

Finally, the pilot valve 75 is stopped at a position where there is established an equilibrium between the magnetic force exerted by the solenoid 17 on the armature 20 in the left-hand direction and the total of the pressure within the pilot chamber 61 and the force of the coil spring 76 exerted in the right-hand direction. The pressure within the pilot chamber 61 is substantially proportional to the electric current flowing through the solenoid 17. The spool 60 is stopped at a position where there is established an equilibrium between the leftward force produced by the pressure within the pilot chamber 61 and the total of the rightward force (which is determined by the product of the difference in pressure-receiving area between the lands 60b and 60c and the pressure within the actuator port 53) and the rightward force of the coil spring 65. Therefore, the pressure within the actuator port 53 is substantially proportional to the intensity of the electric current supplied to the solenoid 17.

As described above, the magnetic circuit constituted by the housing 10, the first stator 11 and the second stator 12 has a very small magnetic resistance. Therefore, the electromagnetic actuator 1A of the present invention can supply a greater exciting force to the armature 20 as compared with the conventional electromagnetic actuator, and therefore an initial responsibility is improved. The application of such a great exciting force to the armature 20 enables the pressure within the pilot chamber 61 to be relatively high. This makes it possible to increase the difference in pressure-receiving area between the lands 60b and 60c related to the force acting against the pressure within the pilot chamber 61, so that the control can be carried out in a stable manner. Another advantage is that the number of the component parts of the magnetic circuit is reduced.

Further, as described above, in the electromagnetic actuator 1A, the annular projection 16d is interposed between the opposed ends of the tubular portions 11b and 12b of the first and second stators 11 and 12 in such a manner that the opposite ends of the projection 16d are held against the opposed ends of the tubular portions 11b and 12b, respectively. With this arrangement, the amount of the air and dust introduced into the guide tube 18 through an annular space formed between the tubular portions 11b and 12b can be reduced, and therefore the movement of the armature 20 along the guide tube 18 is hardly affected. In other words, the dampening action on the armature 20 will not affected by the introduction of the air into the guide tube 18, and the movement of the armature 20 will not be affected by the dust. The above-mentioned Japanese Patent Publication Nos. 7930/80 and 44540/85 and Japanese Laid-Open (Kokai) Utility Model Application No. 18686/88 disclose a cylindrical member of a non-magnetic material interposed between tubular portions of a pair of stators. In the present invention, the projection 16d is formed integrally with the bobbin 16, and therefore the device of the present invention can be manufactured at a lower cost as compared with the above prior art.

In the above embodiment, although the first stator 11 is formed integrally with the housing 10, the second stator 12 may be formed integrally with the housing 10 in which case the first stator 11 is separate from the housing 10.

While the electromagnetic actuator according to the present invention has been specifically shown and described herein, the invention itself is not to be restricted to the exact showing of the drawing or the description thereof, and many modifications can be made. For example, the application of the electromagnetic actuator of the present invention is not limited to the electromagnetic proportional pressure control valve, and it is applicable to a drive mechanism of other devices requiring a proportional control. Also, the present invention is applicable to an electromagnetic actuator for controlling an on-off change valve.

What is claimed is:

1. An electromagnetic actuator comprising:
   (a) a housing made of a magnetic material and having a tubular body;
   (b) a pair of stators made of a magnetic material and disposed at opposite ends of said tubular housing body, each of said pair of stators having a tubular portion, said tubular portions of said pair of stators being disposed coaxially with each other and having their one ends disposed in opposed spaced relation to each other;
   (c) an annular solenoid assembly accommodated within said housing and having opposite end portions in which said tubular portions of said pair of stators are received, said tubular portions of said pair of stators and said solenoid means jointly forming a space, said housing and said pair of stators jointly constituting a magnetic circuit for said solenoid means;
   wherein the solenoid assembly comprises a hollow bobbin of a non-magnetic material and a solenoid mounted around said bobbin, said bobbin having a projection formed on its inner peripheral surface, said projection being interposed between the opposed ends of said tubular portions of said pair of stators in such a manner that the opposite ends of said projection are held against the opposed ends of said tubular portions; and
   (d) an armature received within said space and being operable by said solenoid assembly to move along the axis of said tubular portions, wherein said solenoid assembly, when supplied with an exciting electric current, imparts a force to said armature.

2. An electromagnetic actuator according to claim 1, wherein one of said pair of stators is formed integrally with one end of said tubular housing body so that said one stator and said housing constitute a unitary member.

3. An electromagnetic actuator according to claim 2, in which the other of the pair of stators closes the other end of said tubular housing body, thus serving also as a closure member.

4. An electromagnetic actuator according to claim 3, in which the tubular housing body is thinned at the other end thereof to form an annular thinned portion and to form an annular shoulder at its inner peripheral surface immediately adjacent to said thinned portion, said thinned portion being deformed and clamped to the outer peripheral edge portion of said other stator by pressing in such a manner that an inner surface of said outer peripheral edge portion facing said one stator is held in face-to-face contact with said shoulder.

* * * * *